United States Patent [19]

Sato et al.

[11] 4,024,456

[45] May 17, 1977

[54] GENERATOR SYSTEM WITH SPEED RESPONSIVE OUTPUT WINDING SWITCHING DEVICE

[75] Inventors: Suguru Sato, Obu; Kazumasa Mori, Aichi, both of Japan

[73] Assignee: Nippondenso Co., Ltd., Kariya, Japan

[22] Filed: May 20, 1976

[21] Appl. No.: 688,389

[30] Foreign Application Priority Data

May 29, 1975 Japan .............................. 50-64537

[52] U.S. Cl. .................................. 322/29; 322/90
[51] Int. Cl.² ........................................ H02P 9/00
[58] Field of Search ................. 322/28, 29, 30, 31, 322/32, 90, 93, 94; 321/16; 310/68

[56] References Cited

UNITED STATES PATENTS

| | | | |
|---|---|---|---|
| 3,508,138 | 4/1970 | Schatz .................................. | 322/90 |
| 3,689,826 | 9/1972 | Cherry .................................. | 322/29 |
| 3,694,731 | 9/1972 | Cherry .............................. | 322/29 X |
| 3,932,765 | 1/1976 | Townsend ....................... | 322/29 X |

Primary Examiner—Robert J. Hickey

Attorney, Agent, or Firm—Cushman, Darby & Cushman

[57] ABSTRACT

A first and a second full-wave rectifying network are respectively connected with both ends of phase coils of a current generator for respectively generating alternating current thereat. A first and a second additional diode are respectively connected between both positive and negative direct current terminals of the first and second full-wave rectifying network. A switching device has normally closed contacts connected across the positive and negative terminals of the second full-wave rectifying network, whereby the phase coils act as a star-connected current generating winding so long as the contacts are held closed. The switching device also has an energizing coil for actuating the normally-closed contacts to open by the electromotive force thereof when the rotational speed of the generator exceeds a predetermined value. When the normally-closed contacts are opened, the phase coils no longer act as the star-connected winding but as independently generating windings, to thereby increasing the output current from the generator even when the generator operates at a relatively high rotational speed.

5 Claims, 3 Drawing Figures

4,024,456

GENERATOR SYSTEM WITH SPEED RESPONSIVE OUTPUT WINDING SWITCHING DEVICE

BACKGROUND OF THE INVENTION

1. Field of the Invention

The present invention relates to a current generating system, and more particularly to an alternating current generator used in a motor vehicle for supplying electric power to a battery, electric loads such as lamps and so on.

2. Description of Prior Art

It is recently required for a generating system used in a motor vehicle to produce sufficient electric energy during whole operating conditions, namely at a low speed operation as well as a high speed operation of the generator.

In a general current generator, there is a contrary relationship between output energy at the low speed operation and that at the high speed operation. In other words, the output energy (current) can be increased during the low speed operation when winding turns of generating coils are increased, however the output energy (current) is decreased during the high speed operation by the generator, and vice versa.

To overcome the above drawback, it is conventionally proposed that electrical connections in poly-phase current generating windings of the generator are changed in response to the operating conditions thereof, for example, in a generator of three-phase current generating type, the windings are arranged as three-phase Y-connected windings at the low speed operation and the windings are arranged as respective independent generating windings at the high speed operation.

However, the above proposed generator has the following disadvantages in view of the fact that a plurality of switching elements corresponding to the number of winding phase are required in the proposed generator.
1. An interlocking switching device is required.
2. An unfavorable operation may take place when the plurality of switching elements are not simultaneously closed or opened owing to the transient phenomena. And
3. The output characteristic or life-time of the generator may be badly affected or extremely reduced, when even one of the plurality of the switching elements becomes disordered, since the unbalanced current occurs in the poly-phase generating windings.

SUMMARY OF THE INVENTION

It is, therefore, an object of the present invention to provide an improved generating system to overcome the above drawbacks.

It is another object of the present invention to provide an improved generating system of the type in which the electrical connections of the generating windings are changed in response to the operating conditions.

It is a further object of the present invention to provide a generating system which includes one switching element for changing the electrical connections in the poly-phase generating windings.

It is a still further object of the present invention to provide an improved generating system which is low in cost, simple in construction, reliable in use and so on.

These and other objects of the present invention will be seen by reference to the drawings, taken in connection with the accompanying drawings.

DETAILED DESCRIPTION OF THE PREFERRED EMBODIMENT

Figure 1:
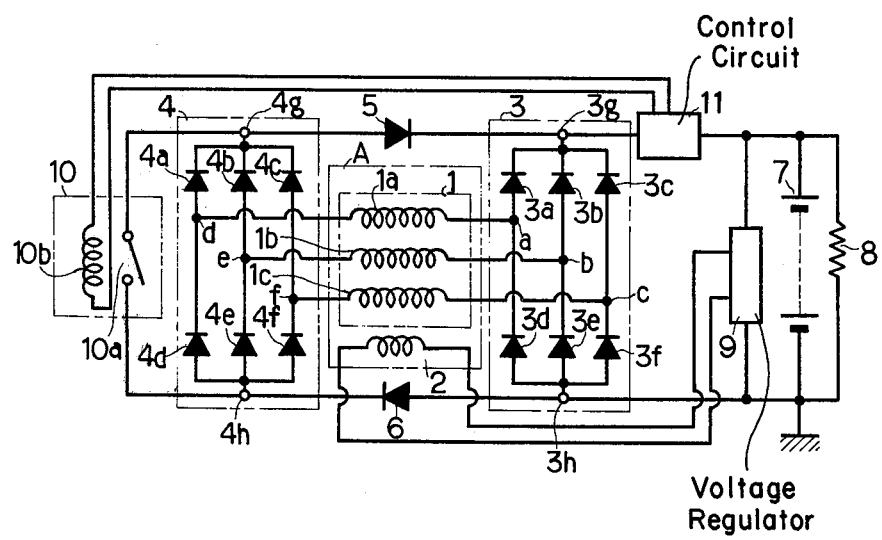
FIG. 1 is an electric wiring diagram showing a generating system according to the present invention.
Figure 2:
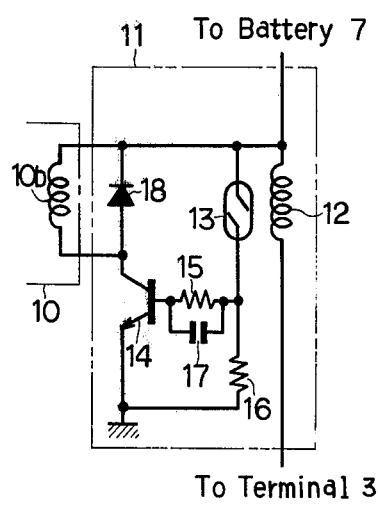
FIG. 2 is an electric wiring diagram showing a control circuit in detail employed in the present invention shown in FIG. 1.

Referring now to FIGS. 1 and 2, a three-phase alternating current generator A, which is driven by an engine (not shown), includes a three-phase generating winding 1 having three generating coils $1a$, $1b$ and $1c$ and a field winding 2. A first full-wave rectifying network 3 includes three positive diodes $3a$, $3b$ and $3c$, three negative diodes $3d$, $3e$ and $3f$, a positive direct current output terminal $3g$ connected with respective cathodes of the positive diodes and a negative direct current output terminal $3h$ connected with the respective anodes of the negative diodes.

Each one end of the three generating coils $1a$, $1b$ and $1c$ is respectively connected with the respective pairs of the positive diodes $3a$, $3b$ and $3c$ and the negative diodes $3d$, $3e$ and $3f$, designated at $a$, $b$ and $c$.

A second full-wave rectifying network 4 likewise includes three positive diodes $4a$, $4b$ and $4c$, three negative diodes $4d$, $4e$ and $4f$, positive direct current output terminal $4g$ connected with the respective cathodes of the positive diodes, and a negative direct current output terminal $4h$ connected with the respective anodes of the negative diodes. Each other end of the three generating coils $1a$, $1b$ and $1c$ is likewise respectively connected with the respective pairs of the positive diodes $4a$, $4b$ and $4c$ and the negative diodes $4d$, $4e$ and $4f$ designated at $d$, $e$ and $f$.

A first additional diode 5 is connected at its anode with the second positive direct current terminal $4g$ and at its cathode with the first positive direct current terminal $3g$ and a second additional diode 6 is likewise connected at its anode with the first negative direct current terminal $3h$ and at its cathode with the second negative direct current terminal $4h$.

A battery 7, mounted in a motor vehicle, is connected across the first full-wave rectifying network 3 and cross the second full-wave rectifying network 4 through the first and the second additional diodes 5 and 6.

An electrical load 8 such as lamps or the like is in turn connected across the battery 7 for being supplied with electric power therefrom through a switch $8a$.

A voltage regulator 9, whose detailed construction is, exemplified in U.S. Pat. No. 3,656,135, is also connected across the battery 7 for detecting the battery voltage and controlling the current supply to the field winding 2, to thereby regulate the voltage across the battery 7 at a predetermined value as in the well-known manner.

A switching device 10 comprises normally closed contacts $10a$ connected between the second positive and negative direct current terminals $4g$ and $4h$ and an energizing coil $10b$ energized by a control circuit 11 connected between the first positive direct current terminal 3g and the positive terminal of the battery 7.

The detailed construction of the control circuit 11 will be explained with reference to FIG. 2.

The control circuit 11 comprises a current coil 12 connected between the first positive direct current terminal 3g and the positive terminal of the battery for detecting the amount of current flowing therethrough from the first and second full-wave rectifying networks 3 and 4, a reed switch 13 disposed adjacent the current coil 12 for being actuated to close its normally-opened contacts when the electromotive force produced at the current coil 12 exceeds a predetermined value, one end of the normally-opened contacts being connected with the positive terminal of the battery 7, a resistor 16 connected between the other end of the normally-opened contacts of the reed switch 13 and the negative terminal of the battery 7, and a transistor 14 having a collector-emitter path and a base connected to a junction between the reed switch 13 and the resistor 16 through a resistor 15 and a capacitor 17. The collector of the transistor 14 is connected with one end of the energizing coil 10b of the switching device 10 and an anode of a diode 18 serving as a diode for absorbing the back electromotive force produced at the coil 10b. The other end of the energizing coil 10b and the cathode of the diode 18 are connected with the positive terminal of the battery 7. The emitter of the transistor 14 is connected with the negative terminal of the battery 7, whereby the energizing coil 10b is supplied with current from the battey 7 when the transistor 14 is made conductive resulting from the closure of the normally opened contacts of the reed switch 13 which is actuated by the electromotive force produced at the current coil 12 as mentioned above.

In operation, when the rotational speed of the generator A is below a preset level, the electromotive force produced at the current coil 12 is not sufficient to close the normally opened contacts of the reed switch 13, keeping the transistor 14 in its non-conductive state. No current flows through the energizing coil 10b of the switching device 10, and thereby the normally closed contacts 10a is held closed, resulting in the shortcircuit between the second positive and negative direct current terminals 4g and 4h.

Accordingly, the generating winding 1 act as a star-connected (three-phase Y-connected) output winding as if each end d, e and f of the respective phase generating coils 1a, 1b and 1c is connected together, whereby the output from the generator A is rectified through said first full-wave rectifying network 3 into direct current which would be charged into the battery 7 and supplied to the electrical load 8 through the control circuit 11.

Figure 3:
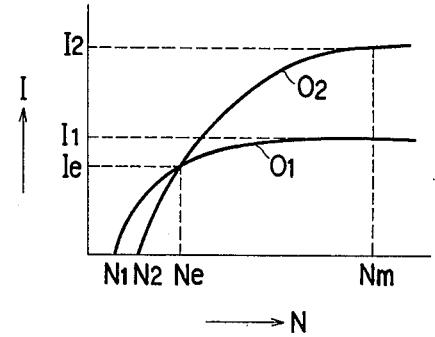
FIG. 3 is a diagram showing characteristic curves of the output according to the present generating system.

A curve $O_1$ in FIG. 3 shows a characteristic one of the output current from the generator A in the above condition, namely when the generating winding 1 act as the three-phase Y-connected output winding. The axis of abscissa in FIG. 3 represents a rotational speed N of the generator A while the longitudinal axis representing the output current from the generator A.

As seen from FIG. 3, the output current according to the curve $O_1$ sharply rises to become sufficient to charge the battery and the electrical loads at a relatively low speed operation (the rotational speed of $N_1$), however the rising rate of the output current becomes smaller as the rotational speed of the generator increases. Namely, the output current produced from the generator with the star-connected winding is sufficient to charge the battery at the relatively low speed operation but insufficient at the relatively high speed operation.

When the normally closed contacts 10a of the switching device 10 are opened, the output current produced at the respective phase coils 1a, 1b and 1c is subjected to the full-wave rectifying operation at the first and the second full-wave rectifying networks 3 and 4. For example, when the voltage appears at the phase coil 1a being positive at end a and negative at the other end d, current flows through the diode 3a, the positive direct current terminal 3g, the control circuit 11, the battery 7 and the electrical load 8, the negative direct current terminal 3h, the diode 6, the negative direct current terminal 4h and the diode 4d. When the voltage polarity is reversed at the phase coil 1a, current flows through the diode 4a, the positive direct current terminal 4g, the diode 5, the positive direct current terminal 3g, the control circuit 11, the battery 7 and the electrical load 8, the negative direct current terminal 3h and the diode 3d. Thus, alternating current produced at the phase coil 1a is subjected to the full-wave rectifying operation carried by the diodes 3a and 3d of the first rectifying network 3 and the diodes 4a and 4d of the second rectifying network 4, and the alternating current produced at the other two phase coils 1b and 1c is likewise subjected to the full-wave rectifying operation respectively carried by the diodes 3b, 3e, 4b and 4e and the diodes 3c, 3f, 4c and 4f, to thereby charge the battery 7 and supply the electrical load 8 with the output direct current.

As in the above operation, the output current characteristics obtained in the full-wave independently rectifying operation becomes similar to that obtained from the delta-connected generating winding, which is indicated by a curve $O_2$ in FIG. 3.

According to the curve $O_2$, the output current from the generator A rises at the rotational speed of $N_2$ higher than $N_1$, becomes equal to the output current $I_e$ of the curve $O_1$ at the rotational speed of $N_e$ and becomes higher than that of the curve $O_1$ above the rotational speed of $N_e$ as seen in FIG. 3. The maximum output current $I_2$ of the curve $O_2$ is almost 1.7 times as high as that $I_1$ of the curve $O_1$.

According to the present embodiment, the normally opened contacts of the reed switch 13 is so arranged as to close its contacts when the amount of current flowing through the current coil 12 exceeds a predetermined value to open the normally closed contacts 10a of the switching device 10, whereby the phase coils 1a, 1b and 1c act as three-phase Y-connected generating winding during the rotational speed of the generator A being below the speed $N_e$ and they act as three-phase independent generating winding during the rotational speed being above the speed $N_e$, thus to obtain the sufficient output energy during the whole operational conditions of the generator.

The present invention may not be limited to the above embodiment, but the control circuit 11 may be of the type which detects the rotational speed of the generator by use of the frequency at one of the phase coils.

Other poly-phase alternating current generator can be also employed in place of the three-phase alternating current generator.

And further, a switching device of contactless type can be also used as the switching device 10.

What is claimed is:

1. A current generating system for a motor vehicle comprising;
   a three-phase alternating current generator having a field winding and three phase coils;
   a first full-wave rectifying network having a first positive direct current terminal, a first negative direct current terminal and three input terminals respectively connected with each one end of said three phase coils;
   a second full-wave rectifying network having a second positive direct current terminal, a second negative direct current terminal and three input terminals respectively connected with each of the other ends of said three phase coils;
   a battery connected across said first positive and negative direct current terminal of said first full-wave rectifying network;
   a voltage regulator including a field control device and voltage responsive means coupled to said field control device and connected across said battery;
   a first diode connected at its cathode with said first positive direct current terminal and at its anode with said second positive direct current terminal;
   a second diode connected at its anode with said first negative direct current terminal and at its cathode with said second negative direct current terminal;
   a switching device having normally closed contacts connected between said second positive and negative direct current terminal and an energizing coil disposed adjacent said contacts; and
   a control circuit including a current coil connected between said first positive direct current terminal and the positive terminal of said battery for producing electromotive force in response to the amount of current flowing therethrough, a reed switch disposed adjacent said current coil and having normally opened contacts actuated to close when the electromotive force at said current coil exceeds a predetermined value, and a switching transistor having a base operatively connected to said battery through said reed switch, the collector-emitter path of said switching transistor being connected to said battery through said energizing coil, whereby said energizing coil is actuated to open said normally closed contacts of said switching device when said switching transistor becomes conductive.

2. A current generating system for a motor vehicle comprising;
   alternating current generator having a field winding and a plurality of phase coils for respectively producing alternating current thereat;
   a first full-wave rectifying network having a first positive direct current terminal, a first negative current terminal and a plurality of input terminals respectively connected with each one end of said plurality of phase coils;
   a second full-wave rectifying network having a second positive direct current terminal, a second negative direct current terminal and a plurality of input terminals respectively connected with each of the other ends of said plurality of phase coils;
   a battery connected across said first full-wave rectifying network;
   a voltage regulator including a field control device coupled to said field winding and voltage responsive means coupled to said field control device and connected across said battery;
   a first diode connected at its cathode with said first positive direct current terminal and at its anode with said second positive direct current terminal;
   a second diode connected at its anode with said first negative direct current terminal and at its cathode with said second negative direct current terminal;
   a switching device having normally closed contacts connected between said second positive and negative direct current terminal and an energizing coil disposed adjacent said contacts; and
   means for detecting the rotational speed of said generator and for supplying said energizing coil with current from said battery when the rotational speed exceeds a predetermined value, whereby said normally closed contacts are actuated to open.

3. A current generating system for a motor vehicle comprising;
   a three-phase alternating current generator having a field winding and three phase coils;
   a first full-wave rectifying network having a first positive direct current terminal, a first negative direct current terminal and three input terminals repsectively connected with each one end of said three phase coils;
   a second full-wave rectifying network having a second positive direct current terminal, a second negative dierct current terminal and three input terminals respectively connected with each of the other ends of said three phase coils;
   a battery connected across said first full-wave rectifying network;
   a voltage regulator including a field control device coupled to said field winding and voltage responsive circuit coupled to said field control device and connected across said battery;
   a first diode connected at its cathode with said first positive direct current terminal and at its anode with said second positive direct current terminal;
   a second diode connected at its anode with said first negative direct current terminal and at its cathode with said second negative direct current terminal;
   switching means normally connecting said second positive direct current terminal with said second negative direct current terminal; and
   control means for detecting the rotational speed of said generator and for actuating said switching means to break the electrical connection between said second positive and negative direct current terminal when the rotational speed of said generator exceeds a predetermined value.

4. A current generating system for a motor vehicle comprising;
   alternating current generator having a field winding and a plurality of phase coils for respectively producing alternating current thereat;
   a first full-wave rectifying network having a first positive direct current terminal, a first negative direct current terminal and a plurality of input terminals, the number of said input terminals corresponding to that of said phase coils and each of said input terminals being respectively connected with each one end of said phase coils;
   a second full-wave rectifying network having a second positive direct current terminal, a second negative direct current terminal and a plurality of input terminals, the number of said input terminals corresponding to that of said phase coils and each of said input terminals being respectively connected with each of the other end of said phase coils;

a battery connected at its positive terminal to said first positive direct current terminal and at its negative terminal to said first negative direct current terminal of said first full-wave rectifying network;

voltage regulating means including voltage responsive means connected across said battery and field control device coupled to said voltage responsive means for controlling current supply to said field winding in accordance with the battery voltage detected by said voltage responsive means;

a first diode having a cathode connected to said first positive direct current terminal and an anode connectd to said second positive direct current terminal;

a second diode having a cathode connected to said second negative direct current terminal and an anode connected to said first negative direct current terminal;

switching means for connecting said second positive direct current terminal with said second negative direct current terminal when the rotational speed of said generator is below a predetermined value, whereby said plurality of phase coils act as a star-connected generating winding;

detecting means for detecting the rotational speed of said generator and producing a trigger signal when the rotational speed exceeds said predetermined value; and actuating means coupled to said detecting means for actuating said switching means to disconnect said second positive direct current terminal from said second negative direct current terminal upon receiving said trigger signal, whereby said plurality of phase coils act as an independently generating winding.

5. A current generating system for a motor vehicle comprising;

alternating current generator having a plurality of phase coils for respectively producing alternating current thereat;

a first full-wave rectifying network having a first positive direct current terminal, a first negative direct current terminal and a plurality of AC input terminals, the number of said AC input terminals corresponding to that of said phase coils and each of said AC input terminals being respectively connected with each one end of said phase coils;

a second full-wave rectifying network having a second positive direct current terminal, a second negative direct current terminal and a plurality of AC input terminals, the number of said AC input terminals corresponding to that of said phase coils and each of said AC input terminals being respectively connected with each of the other ends of said phase coils;

an electrical load connected across said first positive and negative direct current terminal a first diode having a cathode connected to said first positive direct current terminal and an anode connected to said second positive direct current terminal;

a second diode having a cathode connected to said second negative direct current terminal and an anode connected to said first negative direct current terminal;

switching means for connecting said second positive direct current terminal with said second negative direct current terminal when the rotational speed of said generator is below a predetermined value, whereby said plurality of phase coils act as a star-connected generating winding;

detecting means for detecting the rotational speed of said generator and producing a trigger signal when the rotational speed exceeds said predetermined value; and actuating means coupled to said detecting means for actuating said switching means to disconnect said second positive direct current terminal from said second negative direct current terminal upon receiving said trigger signal, whereby said plurality of phase coils act as an independently generating winding.

* * * * *